Jan. 4, 1955   J. C. BOESCH, JR   2,698,528
SHEAR PIN ARRANGEMENT
Filed July 16, 1952

INVENTOR.
JOHN C. BOESCH, JR.
BY
ATTORNEY

United States Patent Office 2,698,528
Patented Jan. 4, 1955

2,698,528

SHEAR PIN ARRANGEMENT

John C. Boesch, Jr., Albany, Ga., assignor to Lilliston Implement Company, Albany, Ga., a corporation of Georgia Application July 16, 1952, Serial No. 299,302

3 Claims. (Cl. 64—28)

This invention relates to an improved shear pin arrangement.

It is well known that where mechanisms are joined together by means of a shear pin, the shear pin is designed to rupture upon an overload so as to prevent damage to the other working parts; however, it frequently occurs that when the shear pin is ruptured particles of metal from the ruptured shear pin will work in between the moving parts and wedge them together again or so score one or more of the parts as to cause appreciable damage.

It is an object, therefore, of my invention to provide a shear pin arrangement in which the scoring or wedging together of parts due to dislodged fractions of a ruptured shear pin is prevented.

Another object of my invention is to provide a shear pin arrangement in which the hole in the shaft through which the shear pin passes is counterbored at both ends.

Another object of my invention is to provide a shear pin arrangement which will operate to overcome disadvantages of the prior art, and which is simple and inexpensive to manufacture.

Other and further objects and advantages of my invention will be apparent from the following description taken in conjunction with the accompanying drawing in which like characters of reference designate corresponding parts throughout the several views, and wherein.

Figure 1:
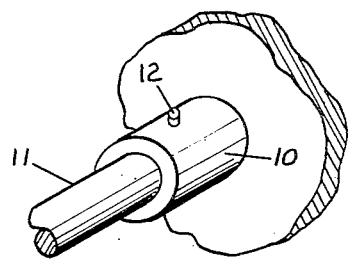
Fig. 1 is a perspective view of a shear pin arrangement embodying my invention.
Figure 2:
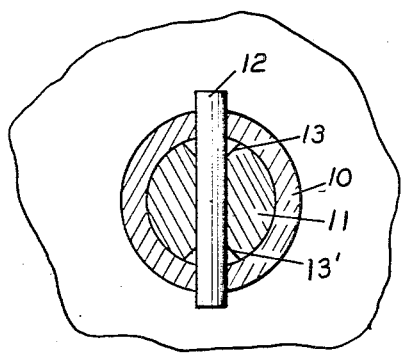
Fig. 2 is a transverse cross-sectional view of the arrangement shown in Fig. 1.
Figure 3:
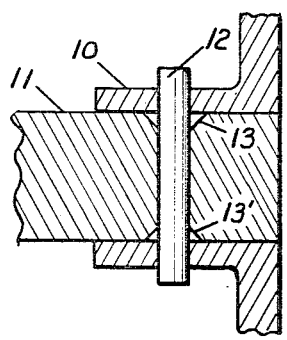
Fig. 3 is a longitudinal cross-sectional view of the arrangement shown in Fig. 1.
Figure 4:
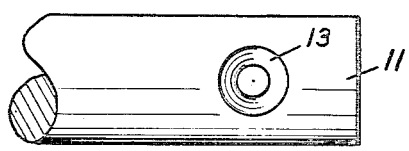
Fig. 4 is a view of a detail.

An arrangement is shown in Fig. 1 wherein a hub 10 is connected to a shaft 11 by means of shear pin 12; and, as seen in Fig. 2, according to my invention, the hole in the shaft through which the shear pin passes is counterbored at both ends as shown at 13, 13', respectively, in order to provide enlarged recesses about the ends of the hole through the shaft.

The recesses which I provide in the shaft at the outer ends of the hole through which the shear pin passes provide adequate free space to receive any particles of metal which may be broken off or become dislodged from the shear pin when it is ruptured. By thus providing a free space to receive loose particles of metal which frequently become dislodged from ruptured shear pins, or which overhang the edges of the shear pin when it is ruptured, my arrangement prevents such extraneous particles from becoming wedged between the hub and the shaft so as to bind these parts together or to score these parts and cause considerable damage. It will be noted particularly that the counterbore at the ends of the hole through the shaft is considerably larger than the diameter of the central bore and is also larger than the diameter of the hole through the hub, so that the hub provides a ledge or cover overhanging the counterbore in the shaft.

It will be obvious that my invention provides a needed article of great convenience and usefulness, and that while I have illustrated and described my invention in a very practical embodiment thereof, various changes and adaptations may be made without departing from the scope of my invention as defined in the following claims.

I claim:

1. Improvement in a coupling having an inner member, an outer member, and a shear pin connecting said members together, said members having a hole therethrough for reception of said shear pin, said improvement being that said inner member is counterbored to enlarge the ends of the hole therethrough for the reception of the burr produced by the shearing of said shear pin.

2. The device of claim 1 wherein the ends of the hole through said inner member are larger than the diameter of the hole through said outer member.

3. The device of claim 1 wherein said outer member overhangs the counterbore in said inner member.

References Cited in the file of this patent

UNITED STATES PATENTS

| | | |
|---|---|---|
| 1,849,174 | Carter | Mar. 15, 1932 |
| 2,566,690 | Wright | Sept. 4, 1951 |